(12) United States Patent
Moser et al.

(10) Patent No.: US 8,315,264 B2
(45) Date of Patent: Nov. 20, 2012

(54) NETWORK SYSTEM USING PATH HEALTH INFORMATION FOR PATH SELECTION

(75) Inventors: Kyle R. Moser, Poughkeepsie, NY (US); Srikanth Subramanian, Chennai (IN); Pedro V. Torres, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 12/640,564

(22) Filed: Dec. 17, 2009

(65) Prior Publication Data
US 2011/0149978 A1 Jun. 23, 2011

(51) Int. Cl.
*H04L 12/28* (2006.01)
*H04L 12/56* (2006.01)

(52) U.S. Cl. ........................ 370/400; 370/401

(58) Field of Classification Search .............. 370/419, 370/400–402; 719/315
See application file for complete search history.

(56) References Cited

U.S. PATENT DOCUMENTS

| | | |
|---|---|---|
| 6,665,304 B2 | 12/2003 | Beck |
| 7,042,837 B1 | 5/2006 | Cassiday |
| 7,379,424 B1 | 5/2008 | Krueger |
| 2003/0142627 A1 | 7/2003 | Chiu |
| 2005/0058063 A1 * | 3/2005 | Masuyama et al. ........... 370/217 |
| 2007/0002767 A1 * | 1/2007 | Holman et al. ............... 370/255 |
| 2009/0133040 A1 * | 5/2009 | Stevens, IV ................... 719/315 |
| 2010/0040078 A1 * | 2/2010 | Newpol et al. ................ 370/419 |
| 2012/0117228 A1 * | 5/2012 | Gabriel et al. ............... 709/224 |

OTHER PUBLICATIONS

CISCO1—"Internet Protocols"—Chapter 30, Internetworking Technology Overview ( Jun. 1999).
CISCO2—"Sample Keepalive Script to Ping Server Address" (Sep. 12, 2007).
CISCO3—"Introdcution to WAN Technologies"—Chapter 3 (Jun. 1999).
MCCRUM—"COM319"—Lab on Networking Protocols (Oct. 24, 2008).
MICROSOFT—"IP Routing Table" (2009).
MICROTIK—"Routes, Equal Cost Multipath Routing, Policy Routing"—Copyright 1999-2007.
TSIRIGOS—"Multipath Routing in the Presence of Frequent Topological Changes", IEEE Communications Magazine (Nov. 2001).
WHITTAL—"ARP and the ARP Table"—The Shuttleworth Foundation ( Nov. 2004).

* cited by examiner

*Primary Examiner* — Chuong T Ho
(74) *Attorney, Agent, or Firm* — David Mims; Mark P Kahler (57) ABSTRACT

A network system employs path health information to select an acceptable path between a source node and destination node within an information handling system (IHS) and/or between a source node within one IHS and a destination node within another IHS. One or more switches may connect these two IHSs together. The network system accesses the path health information to determine the availability of paths for communicating between nodes.

24 Claims, 10 Drawing Sheets

ARP TABLE WITH HEALTH INFORMATION

| DESTINATION IP ADDRESS | PHYSICAL ADDRESS (MAC ADDRESS) | OUTGOING INTERFACE | PATH STATE (HEALTH INFO) |
|---|---|---|---|
| 9.3.108.120 | - | EN0 | DOWN |
| 9.3.108.120 | 0.D.60.F4.57.26 | EN1 | UP |
| 10.1.0.1 | 0.D.60.F4.7.4 | EN0 | UP |

FIG. 3B

ROUTING TABLE

| DESTINATION IP ADDRESS | OUTGOING INTERFACE |
|---|---|
| 9.3.108.120 | EN0 |
| 9.3.108.120 | EN1 |
| 10.1.0.1 | EN0 |

NETWORK SYSTEM USING PATH HEALTH INFORMATION FOR PATH SELECTION

BACKGROUND

The disclosures herein relate generally to information handling systems (IHSs), and more specifically, to communications between IHSs in a network system.

An information handling system (IHS) may communicate with another information handling system via a communication network. Communication networks frequently employ switches that couple IHSs together to facilitate network communication.

BRIEF SUMMARY

In one embodiment, a method of communicating information is disclosed. The method includes partitioning a first information handling system (IHS) into a plurality of first virtual nodes, each first virtual node executing a respective operating system. Each first virtual node shares a common first network adapter. The method also includes partitioning a second information handling system (IHS) into a plurality of second virtual nodes, each second virtual node executing a respective operating system, each second virtual node sharing a common second network adapter. The method further includes coupling the first and second network adapters together via a first switch to enable communication between the first virtual nodes and the second virtual nodes. The method still further includes storing in an address resolution protocol (ARP) table, by the first IHS, path health information for paths among the first virtual nodes and the second virtual nodes. The method also includes accessing, by the first IHS, the path health information in the ARP table to determine if communication between a particular first virtual node and a particular second virtual node is possible. The communication is allowed to proceed if the path health information indicates that a path between the particular first virtual node and the particular second virtual node is available. The communication is halted if the path health information indicates that a path between the particular first virtual node and the particular second virtual node is not available.

In another embodiment, a network system is disclosed. The network system includes a first information handling system (IHS) that is partitioned into a plurality of first virtual nodes, each first virtual node executing a respective operating system. Each first virtual node shares a common first network adapter. The network system also includes a second information handling system (IHS) that is partitioned into a plurality of second virtual nodes, each second virtual node executing a respective operating system. Each second virtual node shares a common second network adapter. The network system further includes a first switch that couples the first and second network adapters together to enable communication between the first virtual nodes and the second virtual nodes. The first IHS stores in an address resolution protocol (ARP) table path health information for paths among the first virtual nodes and the second virtual nodes, such that the first IHS accesses the path health information in the ARP table to determine if communication between a particular first virtual node and a particular second virtual node is possible. The communication is allowed to proceed if the path health information indicates that a path between the particular first virtual node and the particular second virtual node is available. However, the communication is halted if the path health information indicates that a path between the particular first virtual node and the particular second virtual node is not available.

In yet another embodiment, a computer program product is disclosed. The computer program product includes a computer readable storage medium. The computer program product includes first program instructions to partition a first information handling system (IHS) into a plurality of first virtual nodes, each first virtual node executing a respective operating system, each first virtual node sharing a common first network adapter. The computer program product also includes second program instructions to partition a second information handling system (IHS) into a plurality of second virtual nodes, each second virtual node executing a respective operating system, each second virtual node sharing a common second network adapter that couples with the first network adapter via a first switch to enable communication between the first virtual nodes and the second virtual nodes. The computer program product further includes third program instructions that store, in an address resolution protocol (ARP) table of the first IHS, path health information for paths among the first virtual nodes and the second virtual nodes. The computer program product still further includes fourth program instructions that enable the first IHS to access the path health information in the ARP table to determine if communication between a particular first virtual node and a particular second virtual node is possible, the communication being allowed to proceed if the path health information indicates that a path between the particular first virtual node and the particular second virtual node is available, the communication being halted if a path between the particular first virtual node and the particular second virtual node is not available.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In one embodiment, the disclosed network system employs path health information to select an acceptable path between a source node and destination node within an information handling system (IHS) and/or between a source node within one IHS and a destination node within another IHS. One or more switches may connect these two IHSs together. In one embodiment, the disclosed network system accesses the path health information to determine the availability of paths for communicating between nodes.

Figure 1:
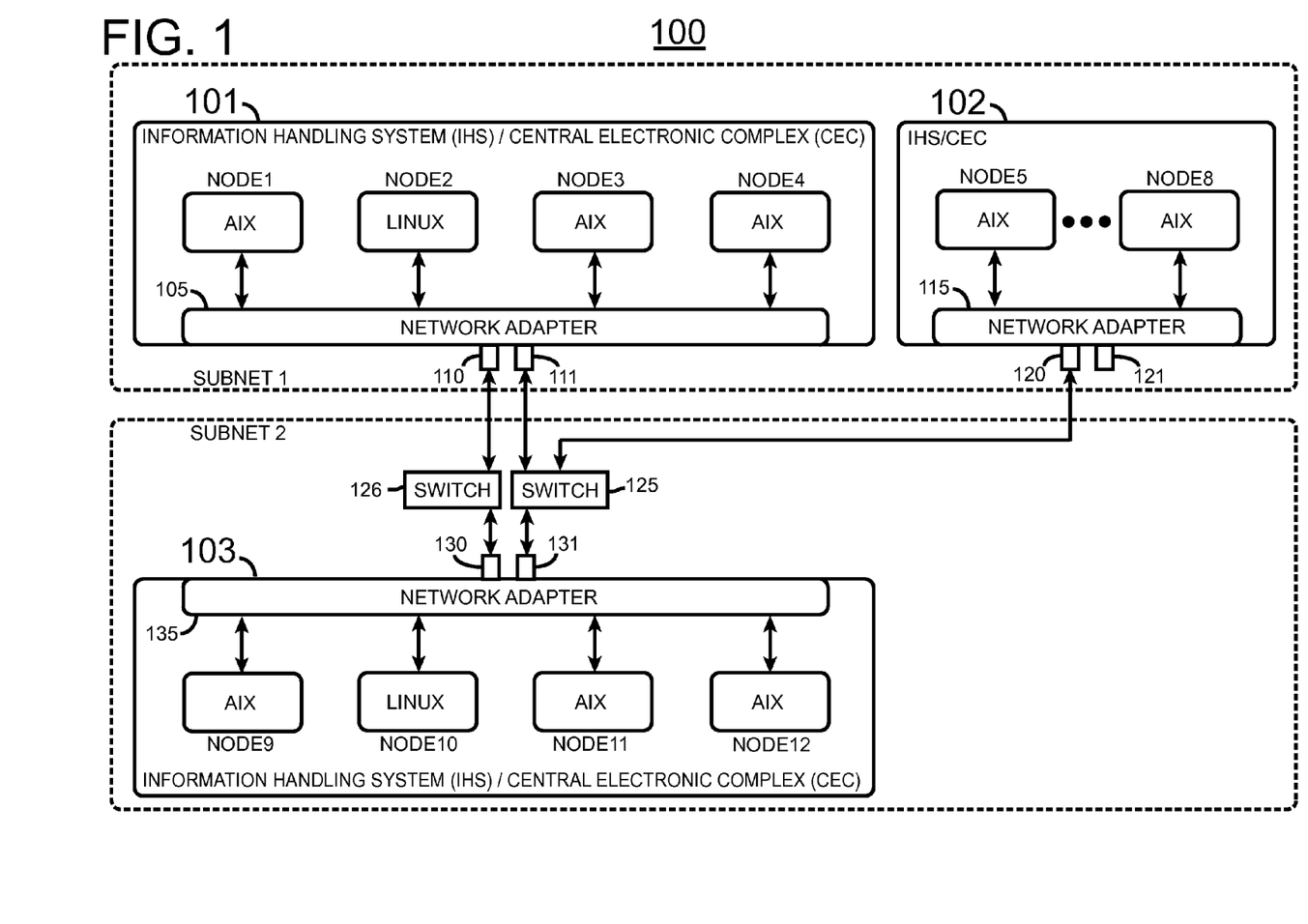
FIG. 1 shows a block diagram of one embodiment of the disclosed network system.

FIG. 1 is a block diagram of a network system 100 that includes an IHS 101, an IHS 102 and an IHS 103. In one embodiment, IHS 101, IHS 102 and IHS 103 are central electronic complexes (CECs). CECs typically employ multiple processor or cores to enhance the computing power of the IHS. IHS 101, IHS 102 and IHS 103 may also be less powerful IHSs than the CECs shown. However, IHS 101, IHS 102 and IHS 103 should exhibit sufficient computing power to enable partitioning of each IHS into multiple virtual nodes or virtual machines.

IHS 101 includes a network adapter 105 for communicating with other IHSs external to IHS 101. IHS 101 partitions into multiple virtual machines or virtual nodes such as NODE1, NODE2, NODE3 and NODE4. IHS 101 may include a greater or lesser number of virtual nodes depending upon the particular application. In this particular embodiment, virtual NODE1 is an AIX virtual machine. (AIX is a trademark of the IBM Corporation.) A user or other entity may configure virtual NODE1 with the AIX operating system. Virtual NODE2 is a LINUX virtual machine. (LINUX is a trademark of Linus Torvalds.) A user or other entity may configure virtual NODE2 with the LINUX operating system. Virtual NODE3 and virtual NODE4 are AIX virtual machines. A user or other entity may configure virtual NODE3 and virtual NODE 4 with the AIX operating system.

Network adapter 105 is a physical hardware structure, whereas virtual nodes NODE1, NODE2, NODE3 and NODE4 are logical structures in that they may exist in software form. NODE1, NODE2, NODE3 and NODE4 may communicate with one another via network adapter 105. In one embodiment, network adapter 105 includes two communication ports, namely port 110 and port 111. Communication port 111 couples via a switch 125 to a communication port 120 of IHS 102.

IHS 102 includes a network adapter 115 for communicating with other IHSs external to IHS 102. IHS 102 partitions into multiple virtual machines or virtual nodes NODE5, NODE6, NODE7 and NODE8 that communicate with a network adapter 115. Network adapter 115 includes communication ports 120 and 121, of which port 120 couples to switch 125. In this particular embodiment, IHS 101 and IHS 102 are in the same subnet, namely subnet 1, as shown in FIG. 1. A virtual node of IHS 101 may communicate with another virtual node of IHS 101 via network adapter 105. Alternatively, a virtual node of IHS 101 may communicate with a virtual node of IHS 102 via switch 125, provided that the path through switch 125 is currently functional, i.e. "up" and available for use.

A virtual node of IHS 101 may also communicate with a virtual node of IHS 103 that is in a different subnet, namely subnet 2. IHS 103 partitions into multiple virtual nodes, such as NODE9, NODE10, NODE11 and NODE12, that communicate with network adapter 135. Network adapter 135 includes communication ports 130 and 131. Communication port 130 of IHS 103 couples via switch 126 to communication port 110 of IHS 101 to enable IHS 101 to communicate with IHS 103. For example, IHS 101 may generate an information packet to send to a destination node in IHS 103. Communication port 131 of IHS 103 couples via switch 125 to communication port 111 of IHS 101. This arrangement provides an alternative path over which a virtual node of IHS 101 may communicate with a virtual node or destination address in IHS 103. If one of switches 125 and 126 malfunctions or goes "down", the other switch is available for communications between a virtual node of IHS 101 and a virtual node of IHS 103.

Figure 2:
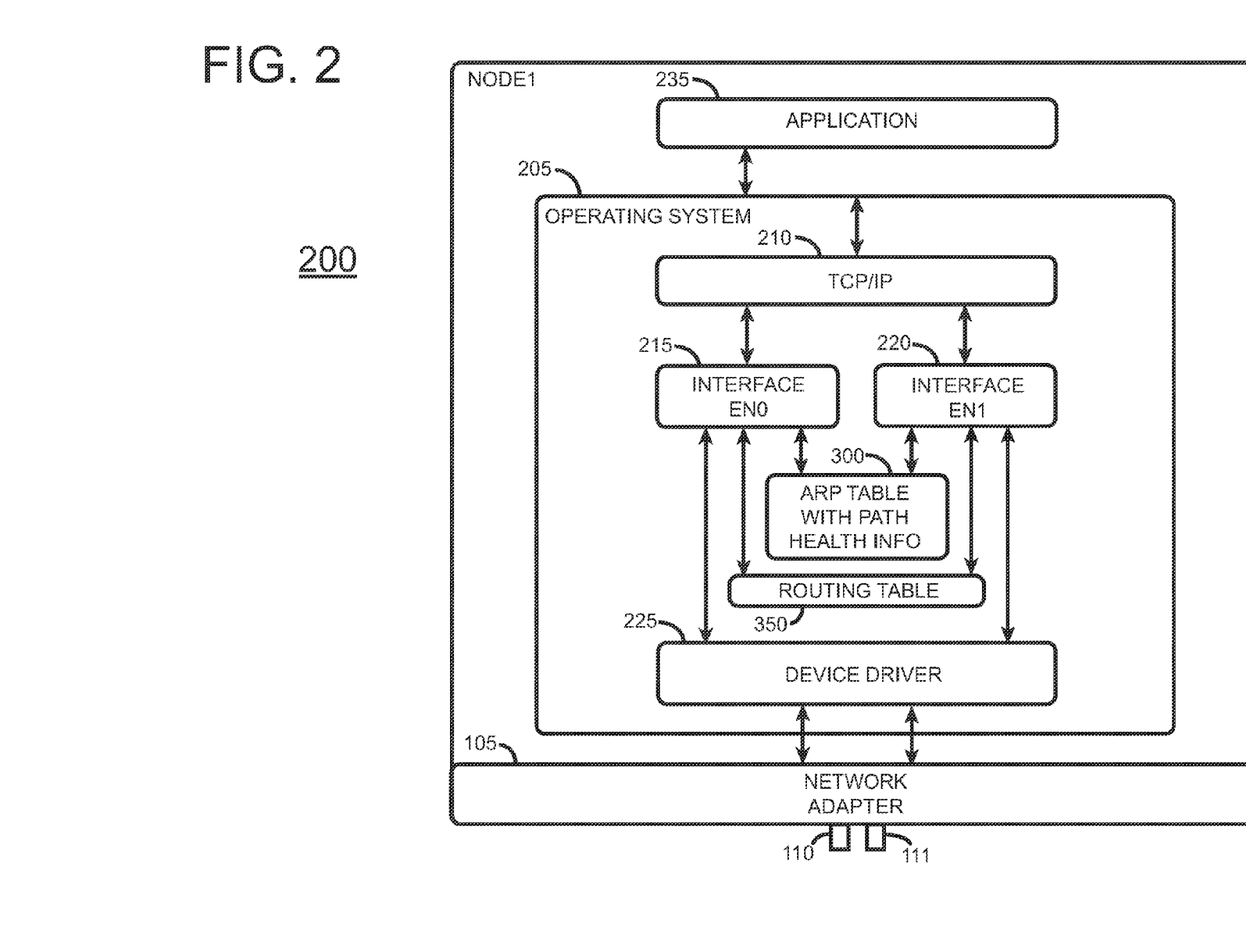
FIG. 2 is representative node of an IHS that the disclosed network system may employ.

FIG. 2 shows a more detailed block diagram of a representative node, e.g. virtual NODE1 of IHS 101. NODE1 includes an operating system 205 that executes on a processor (not shown) within IHS 101. Operating system 205 includes a TCP/IP layer 210, an interface layer 215, 220 and a device driver layer 225. Operating system 205 communicates with an application 235 as shown in FIG. 2. Interface layer 215, 220 corresponds to interfaces EN0 and EN1, respectively. Interfaces 215 and 220 communicate with network adapter 105 via device driver 225. Operating system 205 includes an address resolution protocol (ARP) table 300 that includes path health information with respect to various paths that a node such as NODE1 may take to communicate with other internal nodes within IHS 101 or to communicate with external nodes in IHS 102 or IHS 103.

Figure 3A:
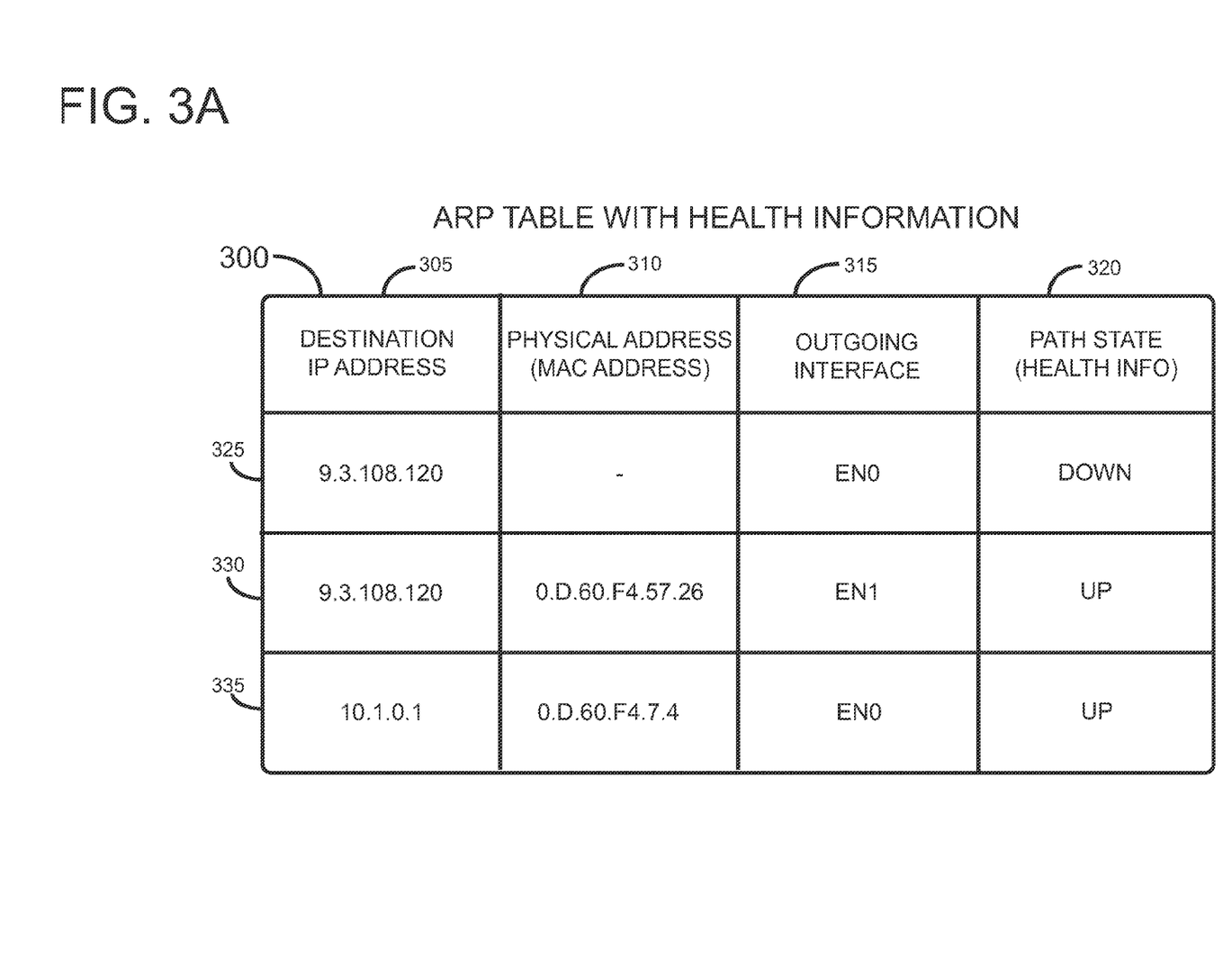
FIG. 3A is an address resolution protocol (ARP) table including path health information that the disclosed network system may employ.

FIG. 3A is a more detailed representation of ARP table 300 including health information for paths between nodes of network system 100. The health information includes the state of each path, namely whether the path is "up" or "down". An "up" path is a path that is available for communication between nodes. A "down" path is a path that is not available for communication between nodes due to a technical problem or other reason. FIG. 3A is a table from the perspective of a node within IHS 101 being the source node and another node being the destination node. The other node may be internal to IHS 101 or may be external to IHS 101, such as within IHS 102 or IHS 103, for example.

ARP table 300 includes a destination IP address column 305, a physical address column 310, an outgoing interface column 315 and a path state or path health information column 320. Each row contains entries corresponding to an internal or external path that a node within IHS 101 may take to communicate with other nodes. From the viewpoint of IHS 101, an internal path is a path between the virtual nodes of IHS 101. In other words, the source and destination addresses of a particular communication packet are both within IHS 101. From the viewpoint of IHS 101, an external path is a path from a virtual node of IHS 101 to either a virtual node in the same subnet 1, such as a virtual node in IHS 102, or a path to a virtual node of IHS 103 which is in subnet 2. Each row of ARP table 300 includes the path state or path health information for the particular destination IP address for that row. For example, row 325 shows a representative destination IP address of another node either internal or external to IHS 101. Row 325 includes path health information in column 320 that indicates that the path to the destination is not functioning and is thus "down" or not available. Row 325 shows no physical address or MAC address in column 310 for this particular destination IP address because the destination node is down. Row 325 shows an outgoing interface of EN0 for this destination node.

Row 330 shows a representative destination IP address of another node either internal or external to IHS 101. Row 330 includes path health information in column 320 that reports that the path to the destination is functioning and is thus "up". Row 330 stores the physical address or MAC address of the destination node in column 310 for this particular destination IP address. Row 325 shows an outgoing interface of EN1 for this destination node. In a similar manner, row 335 shows a representative destination IP address of yet another node either internal or external to IHS 101. Row 335 includes health information in column 320 that reports that the path to the destination is functioning and is thus "up". Row 335 stores the physical address or MAC address of the destination node in column 310 for this particular destination IP address. Row 335 shows an outgoing interface of EN0 for this destination node. While this particular ARP table 300 includes entries for three representative nodes in rows 325, 330 and 335, respectively, network system 100 may employ an ARP table with a greater or lesser number of entries depending on the particular application.

Figure 3B:
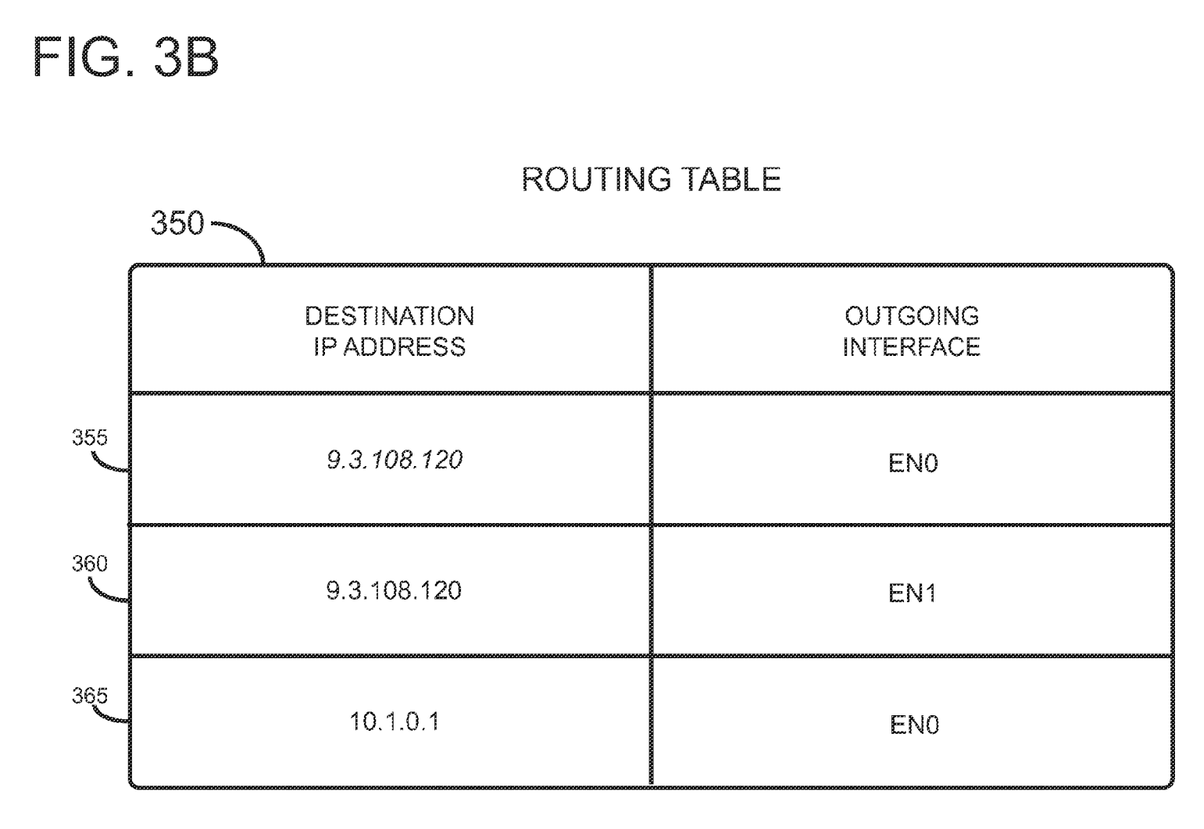
FIG. 3B is a routing table that the disclosed network system may employ.

FIG. 3B shows a routing table 350 that stores destination IP addresses to which a virtual node of IHS 101 may desire to send an information packet or other communication. Routing table 350 includes a respective outgoing interface, such as EN0 or EN1, for each destination address. When TCP/IP layer 210 of IHS 101 has multiple paths available to reach a particular destination node in the same subnet, for example a virtual node in IHS 101 or IHS 102, TCP/IP layer 210 selects an interface for sending a packet to that destination node. For example, to reach destination IP address 9.3.108.120, TCP/IP layer 210 may select outgoing interface EN0, as indicated in row 355 of routing table 350. Alternatively, to reach destination IP address 9.3.108.120, TCP/IP layer 210 may select outgoing interface EN1, as indicated in row 360 of routing table 350. To reach another node, namely destination IP address 10.1.0.1, TCP/IP layer 210 may select outgoing interface EN0, as indicated in row 365 of routing table 350.

Figure 4:
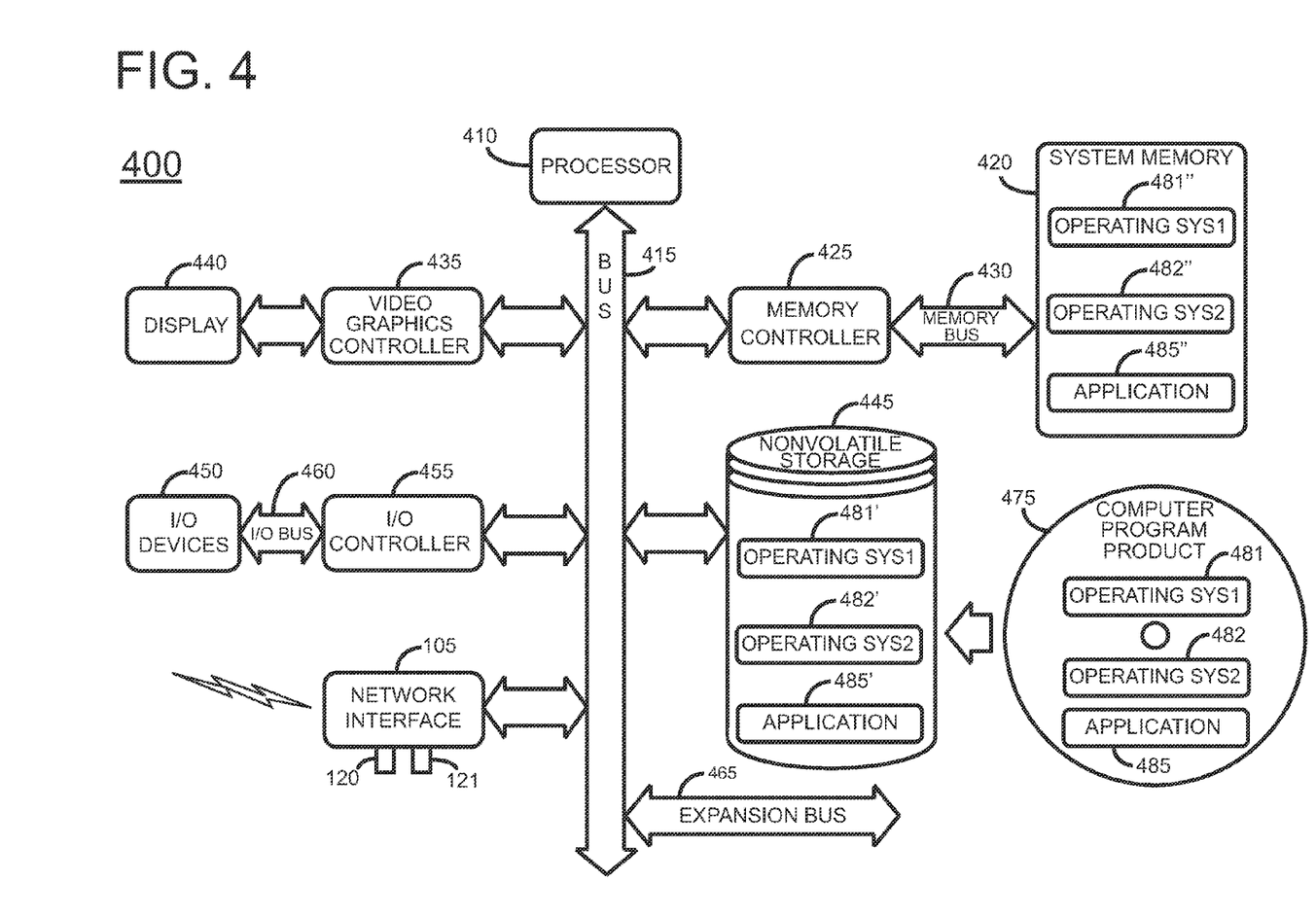
FIG. 4 is a representative node in the information handling system (IHS) that the disclosed network system may employ.

FIG. 4 shows an information handling system (IHS) 400 that is configured to practice the disclosed path selection methodology. Network system 100 may use IHS 400 of FIG. 4 as IHS 101 of FIG. 1. IHS 400 partitions into multiple virtual machines, each with its own operating system. IHS 400 includes a processor 410 that may include multiple cores. IHS 400 processes, transfers, communicates, modifies, stores or otherwise handles information in digital form, analog form or other form. IHS 400 includes a bus 415 that couples processor 410 to system memory 420 via a memory controller 425 and memory bus 430. In one embodiment, system memory 420 is external to processor 410. System memory 420 may be a static random access memory (SRAM) array or a dynamic random access memory (DRAM) array. Processor 410 may also includes local memory (not shown) such as L1 and L2 caches (not shown). A video graphics controller 435 couples display 440 to bus 415. Nonvolatile storage 445, such as a hard disk drive, CD drive, DVD drive, or other nonvolatile storage couples to bus 415 to provide IHS 400 with permanent storage of information. I/O devices 450, such as a keyboard and a mouse pointing device, couple to bus 415 via I/O controller 455 and I/O bus 460. One or more expansion busses 465, such as USB, IEEE 1394 bus, ATA, SATA, PCI, PCIE, DVI, HDMI and other busses, couple to bus 415 to facilitate the connection of peripherals and devices to IHS 400. A network interface adapter 105 couples to bus 415 to enable IHS 400 to connect by wire or wirelessly to a network and other information handling systems. In this embodiment, network interface adapter 110 may also be called a network communication adapter or a network adapter. While FIG. 1 shows one IHS that employs processor 410, the IHS may take many forms. For example, IHS 400 may take the form of a desktop, server, portable, laptop, notebook, or other form factor computer or data processing system. IHS 400 may take other form factors such as a gaming device, a personal digital assistant (PDA), a portable telephone device, a communication device or other devices that include a processor and memory.

IHS 400 includes a computer program product on digital media 475 such as a CD, DVD or other media. In one embodiment, digital media 475 includes an operating system 481 (OPERATING SYS1), an operating system 482 (OPERATING SYS2) and an application 485 that are configured to practice the disclosed path selection methodology. More particularly, a user or other entity configures operating system 481 (OPERATING SYS1) with the AIX operating system that includes an ARP table with path health information (not shown). A user or other entity also configures operating system 482 (OPERATING SYS2) with the Linux operating system to include an ARP table with path health information (not shown). In practice, IHS 400 may store operating system 481 (OPERATING SYS1), operating system 482 (OPERATING SYS2) and application 485 on nonvolatile storage 445 as operating system 481', operating system 482' and application 485'. When IHS 400 initializes, the IHS loads operating system 481' into system memory 420 for execution as operating system 481". Operating system 481" governs the operation of one virtual node of IHS 400. Operating system 482' loads in memory 420 as operating system 482" to govern the operation of another virtual node of IHS 400. IHS 400 also loads application 485' into system memory 420 as application 485". The embodiment of FIG. 1 shows a partitioned IHS with 4 virtual machines or nodes wherein each node includes a respective operating system having a respective ARP table with path health information. Other embodiments may include a greater or lesser number of nodes with respective operating system and ARP tables. These nodes with respective operating systems share the same physical network interface adapter 105. A user or other entity may similarly configure the virtual nodes of IHS 102 and IHS 103 with these operating systems that include ARP tables with path health information.

Returning to FIG. 1, in a first scenario, a source NODE1 in IHS 101 seeks to send a packet to a destination NODE4 also in IHS 101. In this scenario, the source NODE1 and the destination NODE4 are in the same subnet 1 and also within the same IHS 101. Source NODE1 accesses the ARP table for NODE1 and determines from the path health information in this ARP table that the path to the destination address of NODE4 is up. NODE1 then sends the packet to NODE4 within IHS 101. If one or both of switches 125 and 126 are down, the path between NODE1 and NODE4 of IHS 101 is still up and available for communication, as indicated by the path health information for this path. This communication between NODE1 and NODE4 of IHS 101 can still take place even if a cable connecting one of switches 125 and 126 becomes removed. The path health information for the NODE4 destination address will show that the path between NODE1 and NODE4 through network adapter 105 is still up and available.

In a second scenario, the source NODE1 is in IHS 101 and the destination NODE5 is in IHS 102. The source NODE1 and the destination NODE5 are both in the same subnet 1, but not in the same IHS. Source NODE1 and destination NODE5 employ different network adapters, namely network adapter 105 and network adapter 115, respectively. Switch 125 provides a path between source NODE1 and destination NODE5 if switch 125 is up and available. In this second scenario, source NODE1 accesses the ARP table for NODE1 and determines from the path health information that the path from source NODE1 through switch 125 to destination NODE5 is currently up. In response to this determination, NODE1 then sends the packet to NODE5 within IHS 102. In a variation of the second scenario, if the path health information in the ARP table for NODE1 indicates that the path through switch 125 is down, then the communication attempt between NODE1 and NODE5 halts because the path is not available.

In a third scenario, the source NODE1 is in IHS 101 and the destination NODE10 is in IHS 103. The source node and the destination node are thus in different subnets. Source NODE1 accesses its ARP table and determines from the health information for destination NODE10 that the path through switch 126 to destination NODE10 in IHS 103 is down and the path through switch 125 to destination NODE10 is also down. The ARP table includes an entry for each of these two different paths. Since NODE1 learned from the path health information that both paths to NODE10 are down, NODE1 does not send the packet and issues an error. While the above discussion speaks of switches 126 and 125 being up or down, removing a cable between port 110 and switch 126 will make the path through switch 126 go down. Similarly, removing a cable between port 111 and switch 125 will make the path through switch 125 go down. Thus, either of these two events will cause the corresponding health information for those paths to be down in the ARP table of the source NODE1. Likewise, if port 110 is not operating, the path health information in the ARP table will indicate that the path through port 110 and switch 126 to a destination node in IHS 103 is down. If the port 111 is not operating, the path health information ARP table will indicate that the path through port 111 and switch 125 to a destination node in IHS 103 is down. If, when NODE1 accesses the path health information in the ARP table of NODE1, NODE1 determines that the path to NODE10 through switch 126 is down and that the path to NODE10 through switch 125 is up, then NODE1 sends an information packet to destination NODE10 over the available path through switch 125. This action provides a failover capability.

Figure 5A:
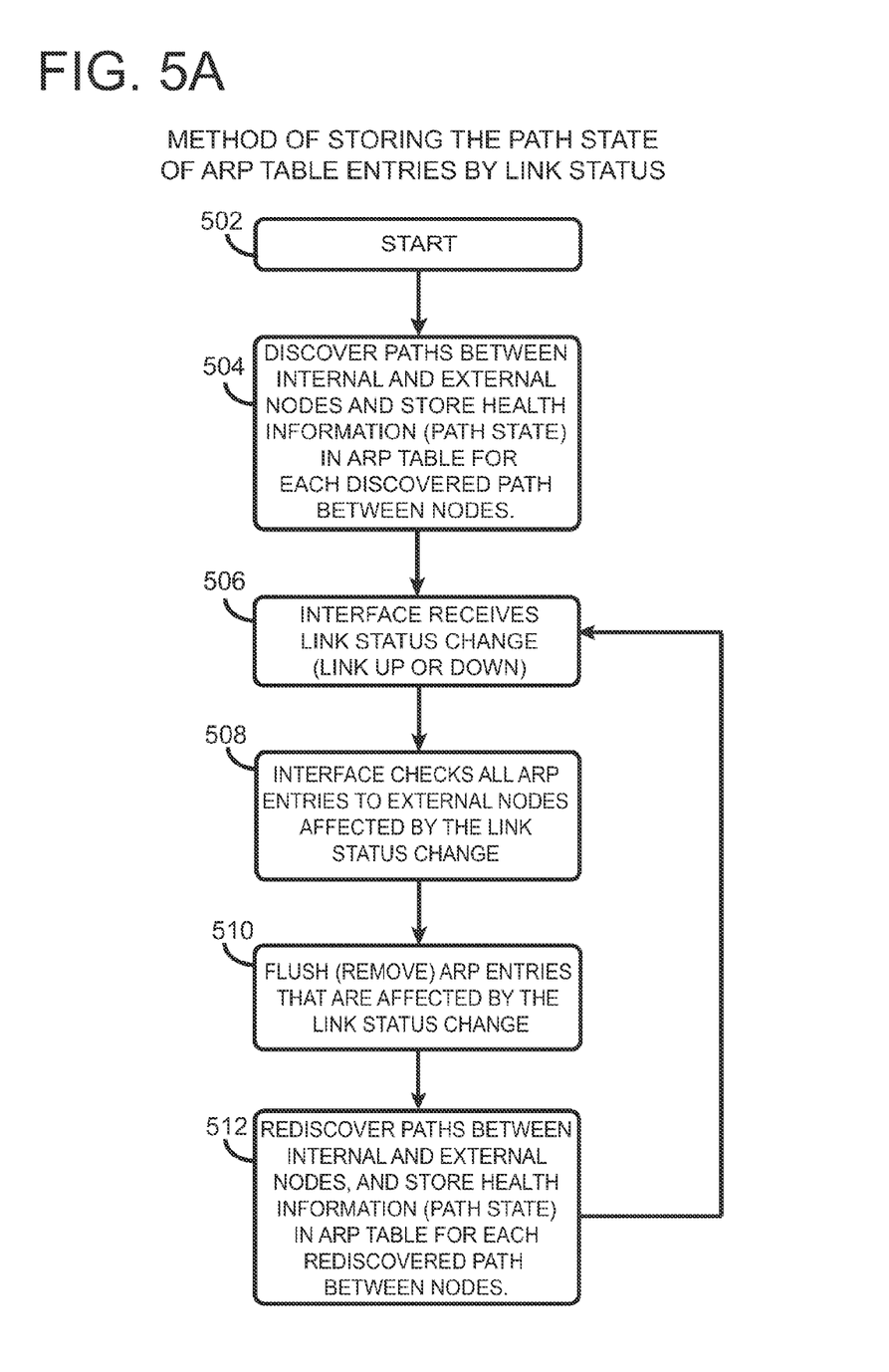
FIG. 5A is a flowchart that depicts one method for populating an ARP table with path health information.

FIG. 5A is a flowchart that depicts process flow in the disclosed method for storing path state information, namely path health information, as entries in an address protocol resolution (ARP) table by link status. A path is the route from a source node to a destination node over which the source node seeks to send an information packet. As seen in FIG. 3A, the ARP table of a particular node includes multiple entries, wherein each entry corresponds to a different destination address. The ARP table records a path state, or path health information, for each destination address. Each entry in the ARP table corresponds to a different discovered destination. The ports of the network adapters of each IHS report path health information back to the ARP table. This path health information indicates where a switch is down or a port is down or up. In more detail, process flow commences at start block 502. TCP/IP layer 210 discovers paths from a source node to destination nodes, as per block 504. TCP/IP layer 210 discovers paths between internal and external nodes. From the perspective of source NODE1 in IHS 101, internal nodes are those nodes within the same IHS as source NODE1, namely NODE2, NODE3 and NODE4 that are inside IHS 101. Also from the perspective of source NODE1, external nodes are those nodes outside of the IHS 101 that includes source NODE1, namely NODE5 . . . NODE8 in IHS 102 and NODE9 . . . NODE12 in IHS 103.

The interface of a source node, for example interface 215 (EN0) stores path health information, namely the path state ("up" or "down") in the ARP table for each discovered path between nodes. The interface discovers paths by sending an ARP request to respective destination nodes. The interface of a source node, for example interface 215 (EN0) of NODE1 of FIG. 2, receives a link status change, as per block 506. The link status change indicates whether a particular link between a source node and destination is currently up or down. The link status change will indicate changes such as an output port of NODE1 becoming nonfunctional or a switch between the source node and destination node becoming nonfunctional. The link status change will also indicate whether the status of a link transitions from down to up, i.e. from nonfunctional to functional.

In response to receiving a link status change, the interface checks all ARP table entries to external nodes affected by the link status change, as per block 508. Also in response to receiving the links status change, the interface flushes or removes entries in the ARP table that the link status change affects, as per block 510. The interface then rediscovers paths between the internal node in which the interface locates and external nodes. Upon rediscovery of a path, the ARP table stores path heath information or the path state of rediscovered paths between nodes, as per block 512. After rediscovery block 512, the interface continues back to block 506 where the interface continues monitoring for the reception of a link status change. Block 506 takes action if the link status changes.

Figure 5B:
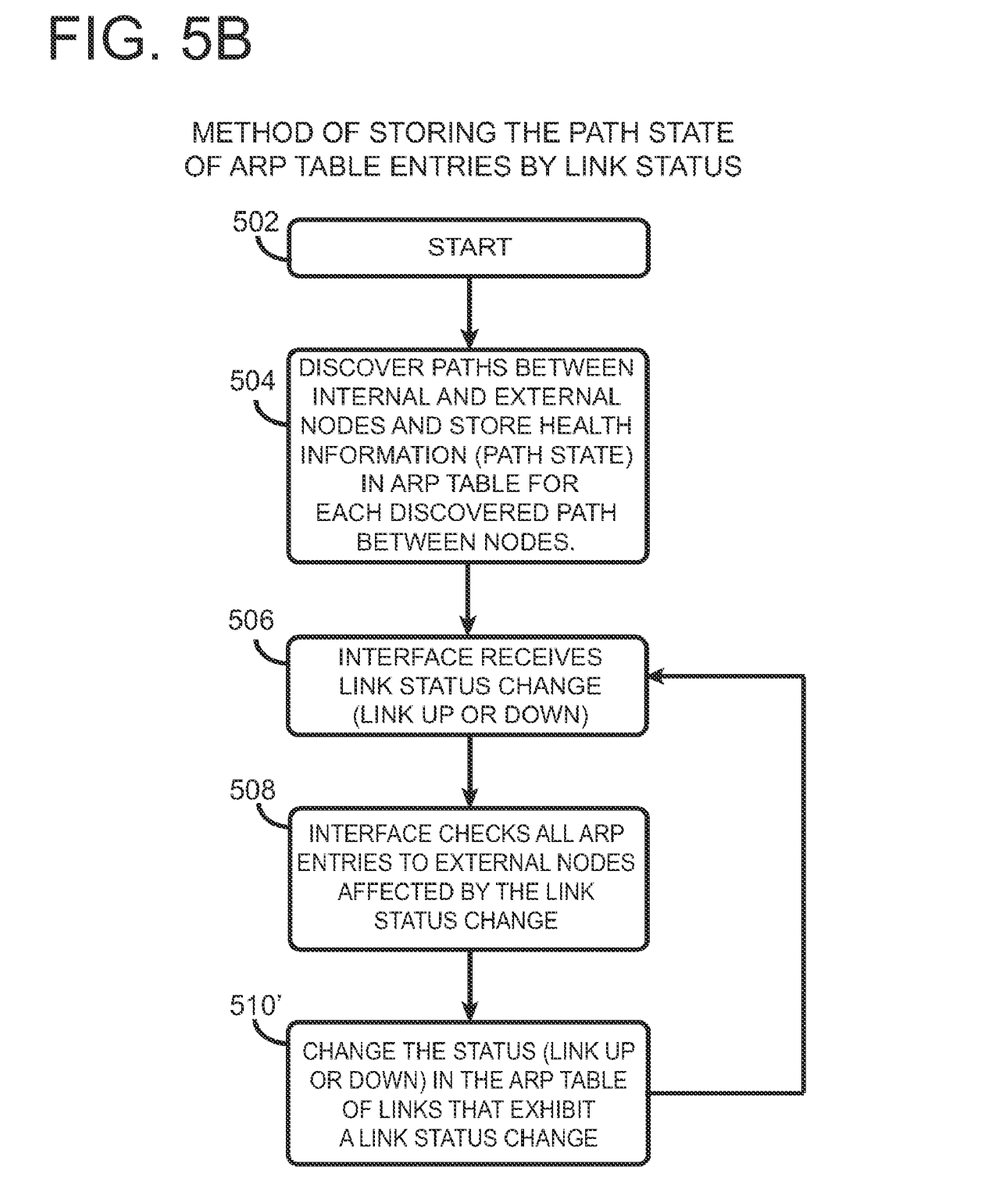
FIG. 5B is a flowchart that shows another method for populating an ARP table with path health information.

FIG. 5B is a flowchart that depicts an alternative process flow in the disclosed method for storing path state information, namely path health information, as entries in an address protocol resolution (ARP) table by link status. The flowchart of FIG. 5B includes many blocks in common with the blocks of the flowchart of FIG. 5A. When comparing the flowcharts of FIGS. 5A and 5B, like numbers indicate like functional blocks. The flowcharts of FIGS. 5A and 5B are similar except that in block 510', the interface changes or updates the status or path health information in the ARP table for those paths that exhibit a link status change. For example, if interface EN0 of the interface of NODE1 receives a link status change (i.e. a link changes status from up to down, or down to up), then that interface changes the path health information for the affected ARP entry to indicate the new path health information for the link associated with that entry. Process flow then continues back to block 506 at which the interface of NODE1 continues monitoring for link status changes.

Figure 5C:
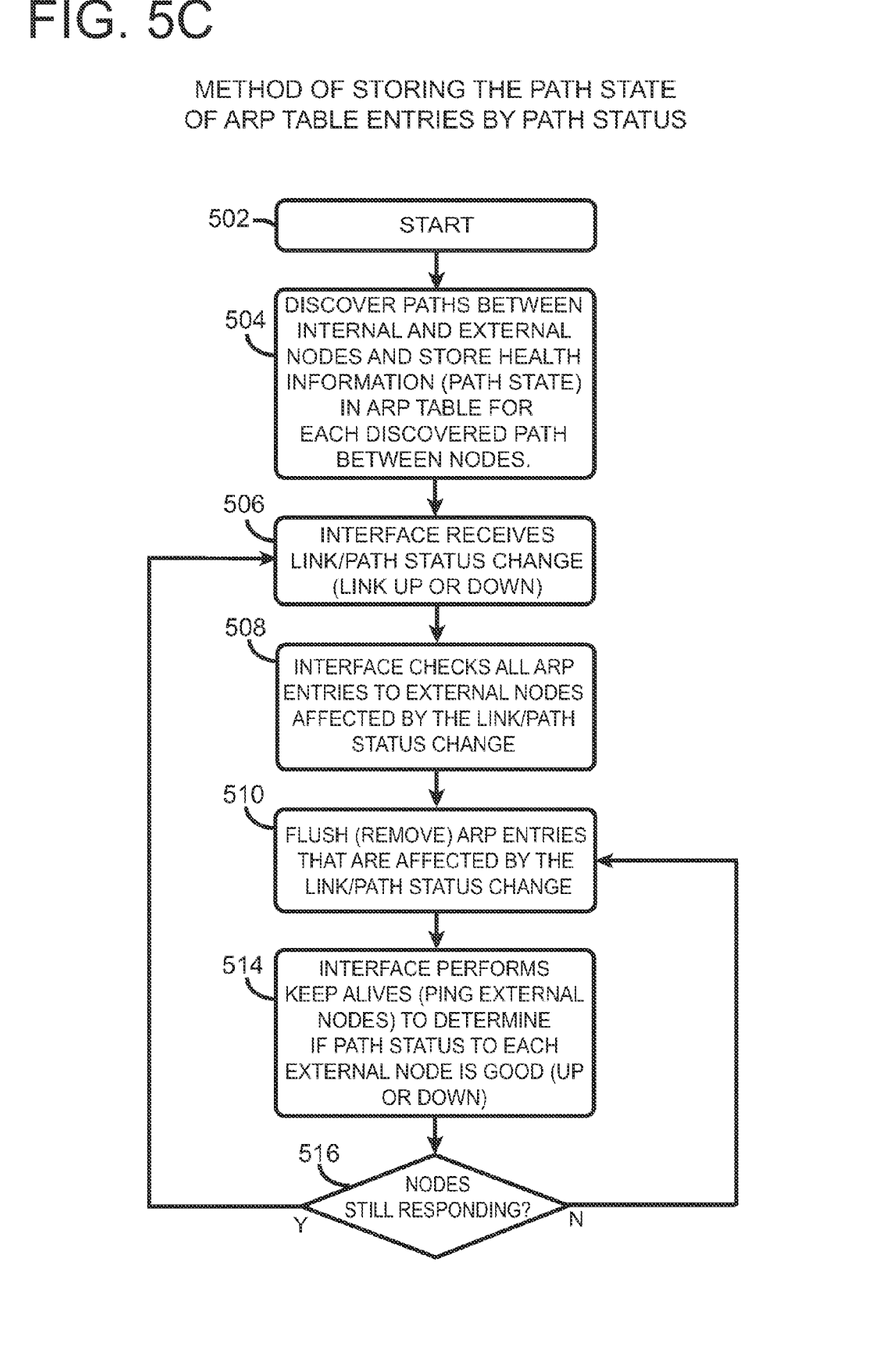
FIG. 5C is a flow chart that shows yet another method for populating an ARP table with path health information.

FIG. 5C is a flowchart that depicts another alternative process flow in the disclosed method for storing path state information, namely path health information, as entries in an address protocol resolution (ARP) table by path status. The flowchart of FIG. 5C includes many blocks in common with the blocks of the flowchart of FIG. 5A. When comparing the flowcharts of FIGS. 5C and 5A, like numbers indicate like functional blocks. The flowcharts of FIGS. 5C and 5A are similar except that in block 514, the interface performs keep alive operations to determine if the path status to each external node in the ARP table is good (i.e. up or down). The keep alive operation may take the form of a ping operation directed to a destination node in the ARP table. The interface of the particular source node then conducts a test to determine if a destination node in the ARP table is still responding, as per decision block 516. If the destination node is still responding, process flow continues back to block 506 at which the interface continues monitoring for link status changes. However, if a destination node is not still responding, process flow continues back to block 510 at which the interface conducts a flush operation to remove ARP entries that the link status change effects.

Figure 5D:
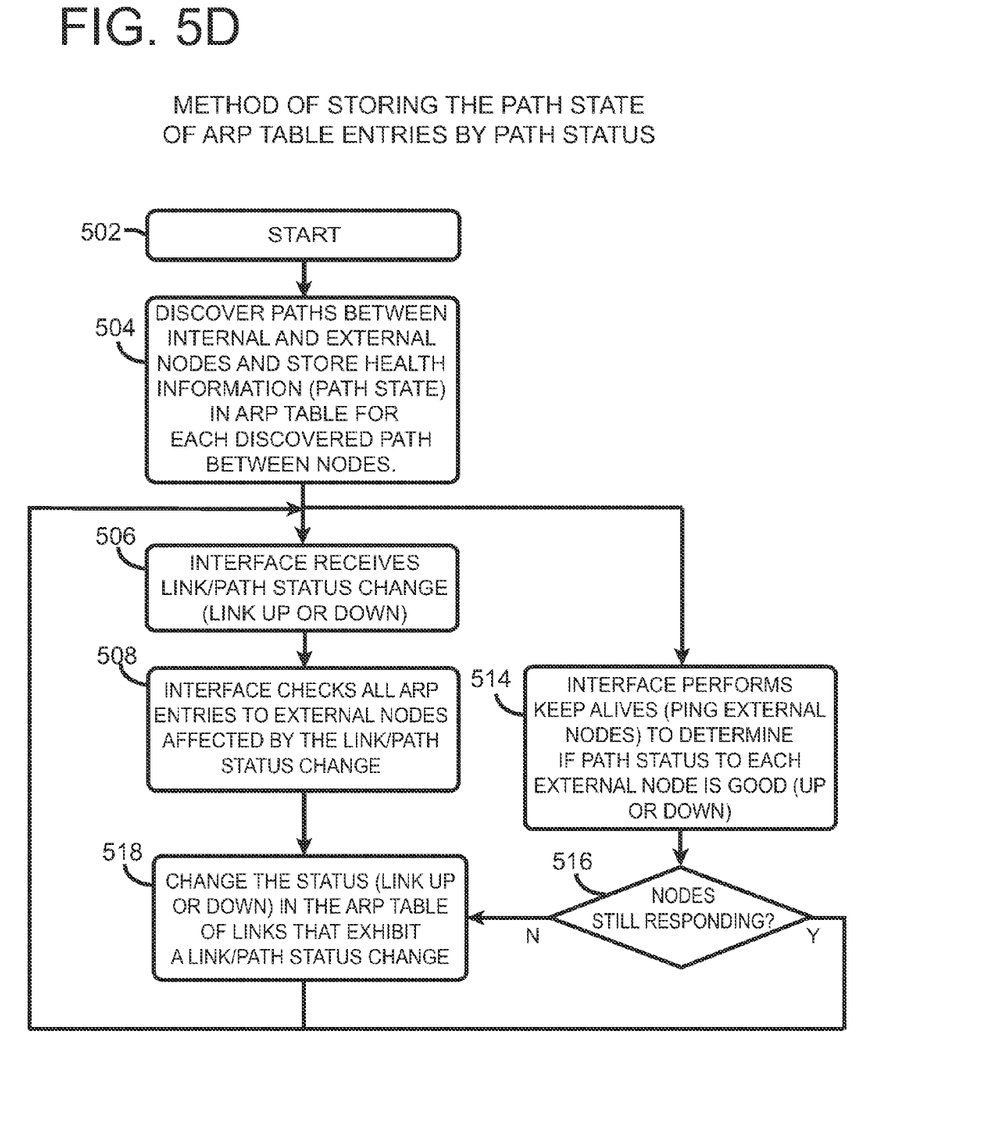
FIG. 5D is a flow chart that shows still another method for populating an ARP table with path health information.

FIG. 5D is a flowchart that depicts yet another alternative process flow in the disclosed method for storing path state information, namely path health information, as entries in an address protocol resolution (ARP) table by path state. The flowchart of FIG. 5D includes many blocks in common with the blocks of the flowchart of FIG. 5C. When comparing the flowcharts of FIGS. 5D and 5C, like numbers indicate like functional blocks. The flowcharts of FIGS. 5D and 5C are similar. However, in block 518 the interface changes the status or path health information in the ARP table for those paths that exhibit a link status change. In parallel with the interface receives link/path status change block 506, the disclosed methodology performs keep alive operations, as per block 514. Keep alive operations may take the form of pings that one node performs on another node to determine if that other node is still responsive, i.e. "up" and available for communication. At the same time, the interface can receive link status changes, as per block 506. If the link to the other node changes status, the ARP table reflects this change. If a keep alive operation to the other node fails, the interface will detect this change when it checks the result of the keep alive operation. The keep alive operations check destination nodes for responsiveness. If a node does not respond, the interface will ultimately check which node is affected by this problem when process flow reaches "interface checks all ARP entries" block 508. If interface EN0 of the interface of NODE2 receives a link status change (i.e. a link changes status from up to down, or down to up), then that interface changes or updates the path health information for the affected ARP entry to indicate the new path health information for the link associated with that entry, as per block 518. The interface performs keep alive operations such as pings to determine path status, as per block 514, that execute in parallel with blocks 506, 508. The source node performs a test to determine if the destination nodes for the keep alive operations are still responding, as per decision block 516. If a node that is the destination of a keep alive operation is not responding, then process flow continues back to block 518 that changes the path status from up to down for the particular nonresponsive destination node that was the subject of the keep alive operation.

Figure 6:
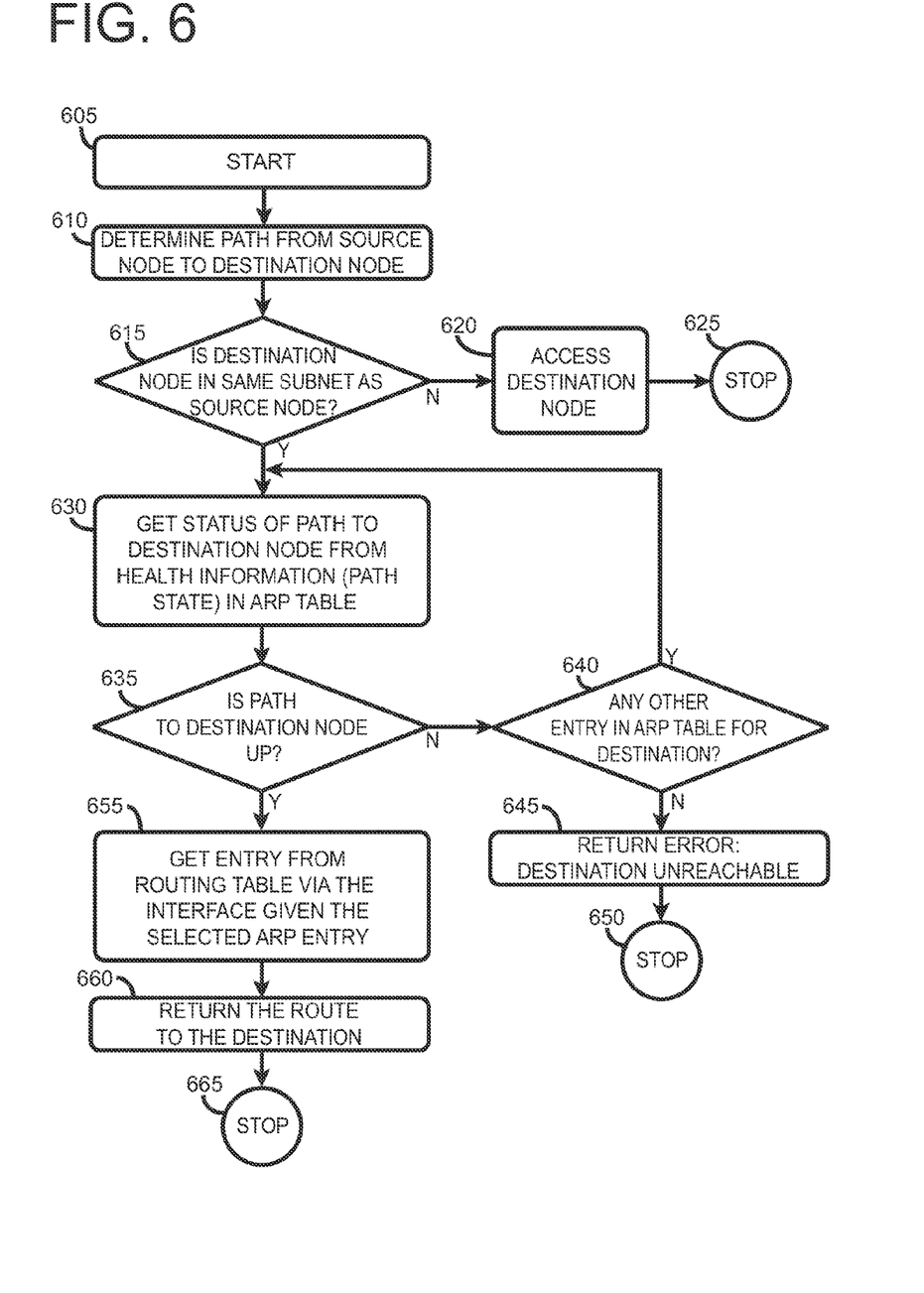
FIG. 6 is a flowchart that shows the disclosed method for selecting a path using the path health information in the ARP table.

FIG. 6 is a flowchart that shows one way in which network system 100 may use path health information in the ARP table to route node to node communications such as information packets. Process flow commences at start block 605. The TCP/IP layer 210 determines a path from the source node to the destination node, as per block 610. TCP/IP layer 210 performs a test to determine if the destination node is in the same subnet as the source node, as per decision block 615. If the destination node is not in the same subnet as the source node, then the TCP/IP layer accesses the destination node by sending an information packet to the destination node. Process flow then stops at stop block 625. However, if the destination node is in the same subnet as the source node, then the source node accesses the ARP table in the source node to obtain the path health information for a path between the source node and the destination node, as per block 630. The source node performs a test to determine if the path between the source node and the destination node is up, as per decision block 635. If the path between the source node and the destination node is up, the source node obtains an entry from the routing table for the interface that the ARP table entry indicates for that path, as per block 655. The source node sends a packet to the destination node in accordance with the routing table information for the destination node, as per block 660. Process flow stops as per block 665. Alternatively, process flow may continue back to start block 605 and the process can begin anew.

However, if at decision block 635, a particular path between the source node and the destination node is not up, then the source node conducts another test to determine if there is another ARP table entry for this destination, as per decision block 640. In other words, decision block 640 determines if there is an another path in the ARP table to the destination node. If there is another path or entry in the ARP table, then process flow continues back to block 630 which accesses the path health information for that entry and the method continues forward as discussed above. However, if decision block 640 determines that there is not another entry in the ARP table for that destination, i.e. no alternative path, then the source nod returns an error. The error may indicate that the destination node is currently unreachable. Process flow then stops at block 650. Alternatively, process flow may continue back to start block 605 and the process can begin anew.

In one embodiment, the process steps performed in the flowcharts of FIG. 5A-5D and FIG. 6 may be included in the operating system of each node in network system 100. In practice, the operating system of the source node will use one of the process flows of FIG. 5A-5D to gather path health information. The operating system uses the process flow of the FIG. 6 flowchart to interpret the path health information in the ARP table and select an appropriate path between a source node and a destination node.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of communicating information, comprising:
   partitioning a first information handling system (IHS) into a plurality of first virtual nodes, each first virtual node executing a respective operating system, each first virtual node sharing a common first network adapter;
   partitioning a second information handling system (IHS) into a plurality of second virtual nodes, each second virtual node executing a respective operating system, each second virtual node sharing a common second network adapter;
   coupling the first and second network adapters together via a first switch to enable communication between the first virtual nodes and the second virtual nodes;
   storing in an address resolution protocol (ARP) table, by the first IHS, path health information for paths among the first virtual nodes and the second virtual nodes; and
   accessing, by the first IHS, the path health information in the ARP table to determine if communication between a particular first virtual node and a particular second virtual node is possible, the communication being allowed to proceed if the path health information indicates that a path between the particular first virtual node and the particular second virtual node is available, the communication being halted if the path health information indicates that a path between the particular first virtual node and the particular second virtual node is not available.

2. The method of claim 1, further comprising:
   accessing, by the first IHS, the path health information in the ARP table to determine if communication between a particular first virtual node in the first IHS and another first virtual node in the first IHS is possible, the communication being allowed to proceed if the path health information indicates that a path between the particular first virtual node and the another first virtual node is available, the communication being halted if a path between the particular first virtual node and the another first virtual node is not available.

3. The method of claim 1, further comprising:
   partitioning a third information handling system (IHS) into a plurality of third virtual nodes, each third virtual node executing a respective operating system, each third virtual node sharing a common third network adapter;

coupling the first and third network adapters together via a second switch to enable communication between the first virtual nodes and the third virtual nodes;

coupling the first and third network adapters together via a third switch to provide an alternative path for communication between the first virtual nodes and the third virtual nodes.

4. The method of claim 1, wherein the first virtual nodes and the second virtual nodes are in the same subnet.

5. The method of claim 3, wherein the first virtual nodes and the third virtual nodes are in different subnets.

6. The method of claim 3, further comprising:

storing in the address resolution protocol (ARP) table, by the first IHS, path health information for paths among the first virtual nodes and the third virtual nodes, the path health information including path health information for a first path between the first IHS and the third IHS via the second switch, the path health information including path health information for a second path between the first IHS and the third IHS via the third switch;

accessing, by the first IHS, the path health information in the ARP table to determine if a communication between a particular first virtual node and a particular third virtual node via the second switch in the first path is possible, the communication being allowed to proceed if the path health information indicates that the first path is available, and alternatively in response to determining that the first path is not available the first IHS proceeding with the communication via the second path if the path health information indicates that the second path is available.

7. The method of claim 1, wherein the ARP table stores destination addresses that specify respective paths between particular first virtual nodes and particular second virtual nodes, the ARP table including path health information for the paths thus specified.

8. A method of communicating information, comprising:

partitioning a first information handling system (IHS) into a plurality of first virtual nodes, each first virtual node executing a respective operating system, each first virtual node sharing a common first network adapter;

partitioning a second information handling system (IHS) into a plurality of second virtual nodes, each second virtual node executing a respective operating system, each second virtual node sharing a common second network adapter;

coupling the first and second network adapters together via a first switch to enable communication between the first virtual nodes and the second virtual nodes;

storing in an address resolution protocol (ARP) table, by the first IHS, path health information for paths among the first virtual nodes and the second virtual nodes;

accessing, by the first IHS, the path health information in the ARP table to determine if communication between a particular first virtual node and a particular second virtual node is possible, the communication being allowed to proceed if the path health information indicates that a path between the particular first virtual node and the particular second virtual node is available, the communication being halted if the path health information indicates that a path between the particular first virtual node and the particular second virtual node is not available;

accessing, by the first IHS, the path health information in the ARP table to determine if communication between a particular first virtual node in the first IHS and another first virtual node in the first IHS is possible, the communication being allowed to proceed if the path health information indicates that a path between the particular first virtual node and the another first virtual node is available, the communication being halted if a path between the particular first virtual node and the another first virtual node is not available;

partitioning a third information handling system (IHS) into a plurality of third virtual nodes, each third virtual node executing a respective operating system, each third virtual node sharing a common third network adapter;

coupling the first and third network adapters together via a second switch to enable communication between the first virtual nodes and the third virtual nodes; and coupling the first and third network adapters together via a third switch to provide an alternative path for communication between the first virtual nodes and the third virtual nodes.

9. The method of claim 8, wherein the first virtual nodes and the second virtual nodes are in the same subnet.

10. The method of claim 8, wherein the first virtual nodes and the third virtual nodes are in different subnets.

11. The method of claim 8, wherein the ARP table stores destination addresses that specify respective paths between particular first virtual nodes and particular second virtual nodes, the ARP table including path health information for the paths thus specified.

12. A network system, comprising:

a first information handling system (IHS) that is partitioned into a plurality of first virtual nodes, each first virtual node executing a respective operating system, each first virtual node sharing a common first network adapter;

a second information handling system (IHS) that is partitioned into a plurality of second virtual nodes, each second virtual node executing a respective operating system, each second virtual node sharing a common second network adapter; and a first switch that couples the first and second network adapters together to enable communication between the first virtual nodes and the second virtual nodes;

wherein the first IHS stores in an address resolution protocol (ARP) table path health information for paths among the first virtual nodes and the second virtual nodes, such that the first IHS accesses the path health information in the ARP table to determine if communication between a particular first virtual node and a particular second virtual node is possible, the communication being allowed to proceed if the path health information indicates that a path between the particular first virtual node and the particular second virtual node is available, the communication being halted if the path health information indicates that a path between the particular first virtual node and the particular second virtual node is not available.

13. The network system of claim 12, wherein the first IHS accesses the path health information in the ARP table to determine if communication between a particular first virtual node in the first IHS and another first virtual node in the first IHS is possible, the communication being allowed to proceed if the path health information indicates that a path between the particular first virtual node and the another first virtual node is available, the communication being halted if a path between the particular first virtual node and the another first virtual node is not available.

14. The network system of claim 12, further comprising:

a third information handling system (IHS) that is partitioned into a plurality of third virtual nodes, each third virtual node executing a respective operating system, each third virtual node sharing a common third network adapter, the third network adapter being coupled to the first network adapter via a second switch to enable communication between the first virtual nodes and the third virtual nodes;

a third switch that couples the first and third network adapters together to provide an alternative path for communication between the first virtual nodes and the third virtual nodes.

15. The network system of claim 12, wherein the first virtual nodes and the second virtual nodes are in the same subnet.

16. The network system of claim 14, wherein the first virtual nodes and the third virtual nodes are in different subnets.

17. The network system of claim 14, wherein the first IHS stores in the address resolution protocol (ARP) table path health information for paths among the first virtual nodes and the third virtual nodes, the path health information including path health information for a first path between the first IHS and the third IHS via the second switch, the path health information including path health information for a second path between the first IHS and the third IHS via the third switch, wherein the first IHS accesses the path health information in the ARP table to determine if a communication between a particular first virtual node and a particular third virtual node via the second switch in the first path is possible, the communication being allowed to proceed if the path health information indicates that the first path is available, and alternatively in response to a determination that the first path is not available the first IHS proceeds with the communication via the second path if the path health information indicates that the second path is available.

18. The network system of claim 12, wherein the ARP table stores destination addresses that specify respective paths between particular first virtual nodes and particular second virtual nodes, the ARP table including path health information for the paths thus specified.

19. A computer program product, comprising:
a non-transitory computer readable storage medium;
first program instructions to partition a first information handling system (IHS) into a plurality of first virtual nodes, each first virtual node executing a respective operating system, each first virtual node sharing a common first network adapter;
second program instructions to partition a second information handling system (IHS) into a plurality of second virtual nodes, each second virtual node executing a respective operating system, each second virtual node sharing a common second network adapter that couples with the first network adapter via a first switch to enable communication between the first virtual nodes and the second virtual nodes;
third program instructions that store, in an address resolution protocol (ARP) table of the first IHS, path health information for paths among the first virtual nodes and the second virtual nodes; and
fourth program instructions that enable the first IHS to access the path health information in the ARP table to determine if communication between a particular first virtual node and a particular second virtual node is possible, the communication being allowed to proceed if the path health information indicates that a path between the particular first virtual node and the particular second virtual node is available, the communication being halted if a path between the particular first virtual node and the particular second virtual node is not available.

20. The computer program product of claim 19, further comprising:
fifth program instructions that enable the first IHS to access the path health information in the ARP table to determine if communication between a particular first virtual node in the first IHS and another first virtual node in the first IHS is possible, the communication being allowed to proceed if the path health information indicates that a path between the particular first virtual node and the another first virtual node is available, the communication being halted if a path between the particular first virtual node and the another first virtual node is not available.

21. The computer program product of claim 19, further comprising:
sixth program instructions to partition a third information handling system (IHS) into a plurality of third virtual nodes, each third virtual node executing a respective operating system, each third virtual node sharing a common third network adapter, wherein the first and third network adapters couple together via a second switch to enable communication between the first virtual nodes and the third virtual nodes, wherein the first and third network adapters couple together via a third switch to provide an alternative path for communication between the first virtual nodes and the third virtual nodes.

22. The computer program product of claim 19, wherein the first virtual nodes and the second virtual nodes are in the same subnet.

23. The computer program product of claim 21, wherein the first virtual nodes and the third virtual nodes are in different subnets.

24. The computer program product of claim 21, further comprising:
seventh program instructions that store, in the address resolution protocol (ARP) table in the first IHS, path health information for paths among the first virtual nodes and the third virtual nodes, the path health information including path health information for a first path between the first IHS and the third IHS via the second switch, the path health information including path health information for a second path between the first IHS and the third IHS via the third switch;
eighth program instructions that access, the path health information in the ARP table in the first IHS, to determine if a communication between a particular first virtual node and a particular third virtual node via the first switch in the first path is possible, the communication being allowed to proceed if the path health information indicates that the first path is available, and alternatively in response to determining that the first path is not available the first IHS proceeding with the communication via the second path if path health information indicates that the second path is available.

* * * * *